Aug. 4, 1942.    G. W. BABCOKE    2,291,940
SUBMARINE VESSEL
Filed Jan. 19, 1942
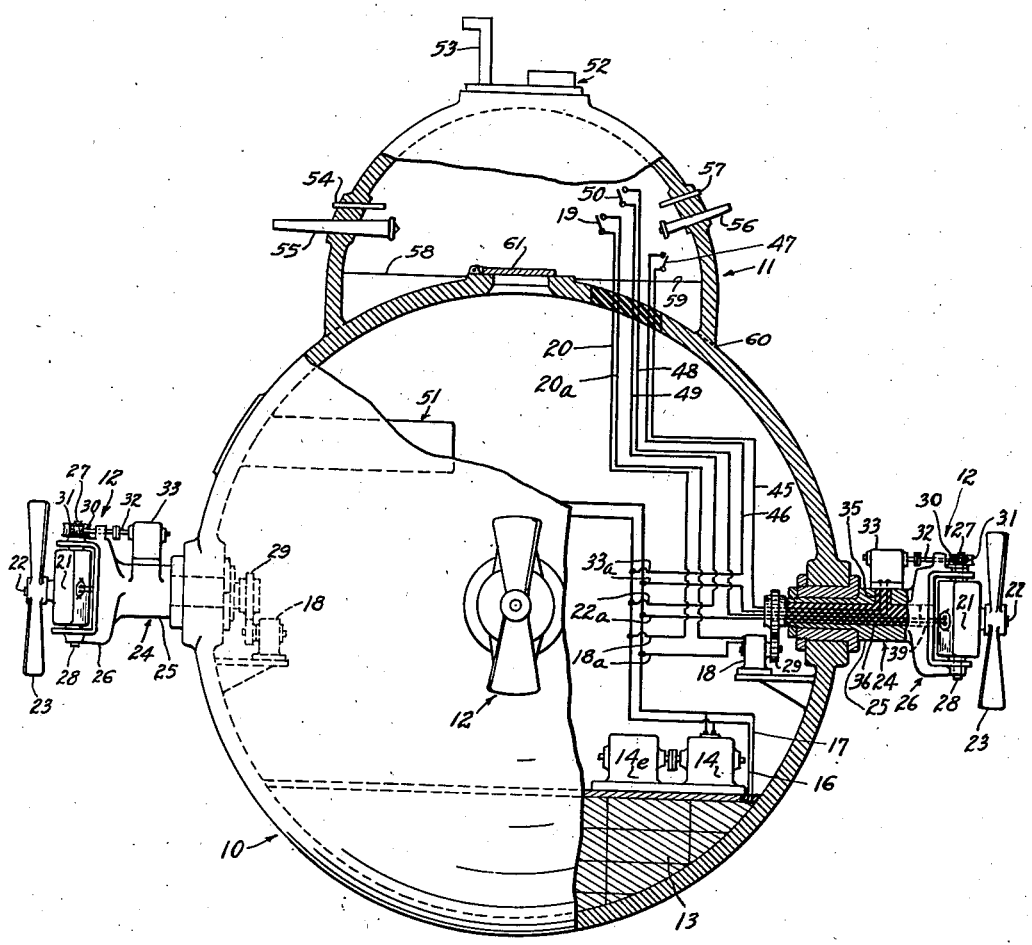
INVENTOR
George Wilbur Babcoke
BY Robt. D. Pearson
ATTORNEY Patented Aug. 4, 1942

2,291,940

UNITED STATES PATENT OFFICE 2,291,940

SUBMARINE VESSEL

George Wilbur Babcoke, Los Angeles, Calif.

Application January 19, 1942, Serial No. 427,357

4 Claims. (Cl. 114—1)

This invention relates to a submarine vessel for military use.

Among the objects of the invention are: to provide for mounting larger cannon upon submarines; to provide improved means for dividing the vessel into safety compartments so that if one compartment is damaged the other may remain intact; and to provide an improved mounting means for a propeller so that it may be directionally controlled in a universal manner.

It is another object of the invention to provide a hull for the vessel of a more generally globular form so that it will more effectually resist water pressure and withstand heavier external shocks.

Other objects, advantages and features of invention will hereinafter appear.

Referring the accompanying drawing, which illustrates what is at present deemed to be a preferred embodiment of the invention, The drawing is a partly elevational and partly sectional view of the complete device, portions of the structures therein being shown diagrammatically.

Referring in detail to the drawing, the principal parts of the structure shown are the main globular hull 10, the auxiliary hull 11 of a semi-globular character into the lower part of which the upper portion of said main hull projects, and the propeller structure 12 which is supported in a universally adjustable manner exteriorly of said main hull. The hull portions 10 and 11 have thick walls and are heavily armored, thus enabling them to withstand high water pressures as well as severe external shocks from depth bombs or other sources.

In the lower portion of the hull 10 a space of a plano-convex shape is reserved for storage batteries 13 as well as for any heavy ballast that it may be desired to add. Above this space is a generator set which includes the generator 14 and the engine 14e by which it is operated. This generator set directly supplies current to the various motors during surface navigation, and also recharges the batteries 13. From said generator a pair of leads 16 and 17 conveys current to a motor 18 located within the casing 10.

Exterior to said casing 10 is a motor 21 the shaft 22 of which has secured to it a propeller 23. In order to support, in a universally adjustable manner, the motor 21 and propeller carried thereby, a hollow, turnable shaft 24 is supported by and extends through the wall of the casing 10 in a liquid tight manner.

Outside of said casing said shaft 24 has a slightly diametrically enlarged part 25 the outer part of which carries a bifurcated head 26, the motor 21 having trunnions 27 and 28 whereby it is swingably supported by and between said arms.

Rotational adjustment of the hollow shaft 24 is effected by operating the aforementioned motor 18 in reverse directions, this motor being operatively connected with said shaft by means of gearing 29. Said motor 18 has its current controlled by a switch 19 in the upper hull 11, this switch controlling the current through wires 20, 20a connected respectively with the wires 16 and 17. The motor 18 is connected with wire 17 by a lead 18a.

In order to swingably adjust the motor 21 its upper trunnion 27 has secured to it a beveled worm gear 30 with which meshes a driving worm gear 31 carried by the shaft 32 of a small motor 33 fixed to the aforesaid shaft portion 25. In order to supply current to the motors 21 and 33 (which are of a conventional water tight kind) the hollow shaft portion 25 is provided with a lateral passage 35 which communicates with its main passage 36; also said main passage 36 terminates within the head 26, and from its terminal portion an angular passage 37 leads to the lower trunnion 28 of the motor 21, at which point said passage 37 is continued, through a stuffing box 39 to the motor 21. This mechanical detail will be carried out in any suitable conventional manner, and is not detailed in the drawing, where the wiring of the motor 21 is shown diagrammatically.

The three motors 21, 33 and 18 are all supplied with current from the main line wires 16 and 17. The leads from these wires for the motor 18 have already been described. Also leads 33a, 45 and 46, the latter two leading to a switch 47, control the current for motor 33; and as to the motor 21 it is likewise supplied by conductors 22a, 48 and 49, the latter two conductors leading to a switch 50 and their current delivery portions passing through the aforesaid angular passage 37. All the switches 19, 47 and 50 are shown located in the upper part of the auxiliary hull 11.

Within the main hull 10 is shown a torpedo tube 51, and it is to be understood that other conventional equipment (which, separately considered, forms no part of the present invention) will be contained within said main hull.

The vessel is shown furnished with a conning tower 52 and a periscope 53.

A small sealed sight tube 54 is shown extending through the wall of the vessel a little above the cannon 55, and the smaller cannon 56 is likewise provided with a sealed sight tube 57. Both of said cannon extend through the wall of the vessel in a fluid tight manner and are directed toward targets only by varying the position of the vessel as a whole by adjusting the motors 21 in the universal manner which has been described while said motor is rotating the propeller 23 which is carried by its shaft. Said propeller 23 serves both to propel and steer the vessel and also to sight, one at a time, the cannon carried by the upper part of the vessel. A platform 58 is shown subjacent to the cannon 55 and a platform 59 subjacent to the cannon 56.

At the juncture of the upper or auxiliary hull 11 with the main hull 10 there is provided a fluid tight joint 60.

A trap door 61 leads from the top of the lower hull 10 into the central portion of the upper hull 11, said door sealing in a fluid tight manner in case of liquid under pressure entering said upper hull.

The propeller 23 together with its mounting means, will desirably be duplicated at one or more additional points, preferably at a distance of ninety degrees from each other in relation to the circumference of the vessel. Such an arrangement will give a quicker control of the position of the vessel.

A set of electrical conduits and of switches for controlling them, like those illustrated by way of example in the drawing, will be supplied for each propeller and the means for its control and operation.

I claim:

1. In a submarine vessel, in combination with the hull of the vessel, a hollow turnably adjustable shaft extending through the wall of said hull in a fluid tight manner, means within said hull to turnably adjust said shaft, a motor having a driving shaft to which a propeller is fixed, said motor being mounted upon said hollow shaft exteriorly of said hull by means permitting it to swing to different angles in relation to the axis of said hollow shaft, a control motor mounted on said hollow shaft exterior of the hull and operatively connected with the first recited motor to swing it to different angular adjustments, and current supply conductors for said control motor leading through said hollow shaft.

2. The subject matter of claim 1 and, a cannon supported by said hull in a fixed relation thereto.

3. The combination, with the hull of a submarine vessel; of a hollow shaft projecting through the wall of said hull in a turnably adjustable manner, the projecting portion of said shaft being bifurcated, a motor having trunnions whereby it is supported between the bifurcations of said shaft for swingable adjustment, said motor having a shaft to which a propeller is secured, a control motor also mounted on said hollow shaft exteriorly of the hull, the passage of said hollow shaft having extensions leading to both of said motors, conductors leading from the interior of the hull through said passage and its extensions to both of said motors to supply operating current to them, means whereby said control motor is operatively connected with said swingable motor to swingably adjust the latter, and means within the vessel to turnably adjust said hollow shaft.

4. The subject matter of claim 3 and, said means for turnably adjusting said hollow shaft comprising a motor operatively connected therewith and current supply means for said motor controllable by a switch located in the upper portion of the vessel.

GEORGE WILBUR BABCOKE.